United States Patent Office 3,368,148
Patented Feb. 6, 1968

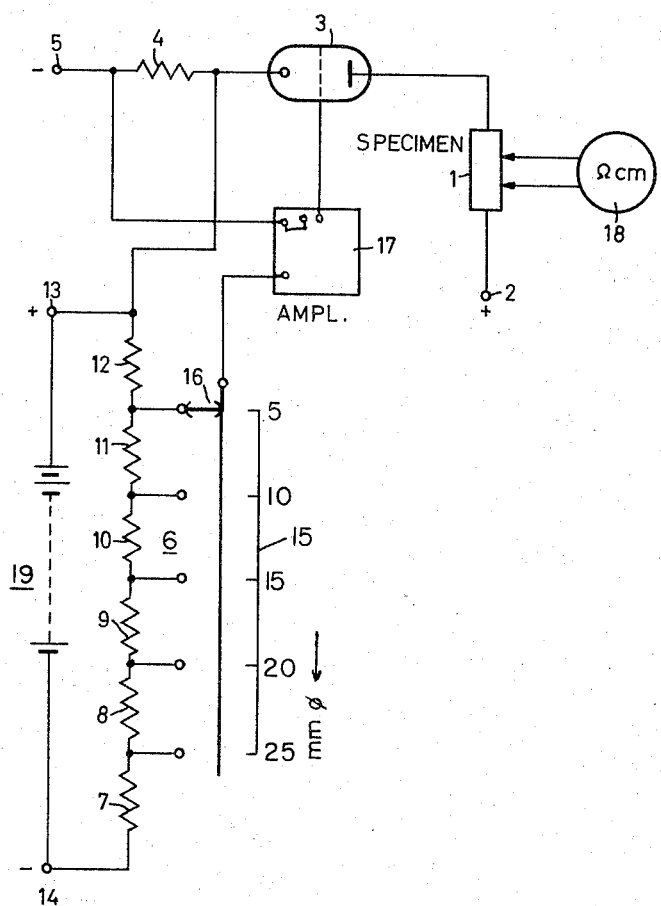

3,368,148
METHOD AND DEVICE FOR MEASURING THE SPECIFIC ELECTRIC RESISTANCE OF ELECTRONIC SEMICONDUCTORS
Hans Stuf, Lochham, near Munich, Germany, assignor to Siemens-Schuckertwerke Aktiengesellschaft, Berlin-Siemensstadt, Germany, a corporation of Germany
Filed Oct. 1, 1962, Ser. No. 227,195
Claims priority, application Germany, Sept. 30, 1961, S 76,102
6 Claims. (Cl. 324—64)

My invention relates to a method and device for measuring the specific electric resistance of electronic semiconductors.

Methods and devices of this kind are often employed for measuring the resistance characteristic along the length of semiconductor rods, such as crystalline rods of silicon or germanium, in order to obtain in this manner a criterion for maintenance of a desired quality, revealing for example the existence of a desired or undesired dopant concentration at respective localities along the rod. The usual method is to pass electric current through the semiconductor rod, measure the resistance of the rod between two mutually spaced points along its length, and then calculate the specific resistance from the measured magnitudes of voltage and current.

It is an object of my invention to simplify the measuring operations and reduce the time required for determining the specific resistance curve over the length of the semiconductor rod. Another and more specific object of my invention is to devise a method and equipment for directly indicating the measured results in terms of specific resistance at the localities or portions of the semiconductor rod under observation.

According to my invention I proceed as follows. First I ascertain manually or by automatic means the diameter of the semiconductor rod at the measuring length where the specific resistance is to be determined. I then adjust a potentiometer, calibrated in terms of specimen diameter, to a resistance setting corresponding to the diameter ascertained of the specimen, the potentiometer graduation being in square-law dependence upon the diameter and hence in proportion to the cross sectional area, so that a change in setting of the potentiometer from one to another resistance value changes the potentiometric output voltage from a magnitude corresponding to the square value of the first diameter to a magnitude corresponding to the square value of the second diameter. I further connect the potentiometer output voltage, as a reference magnitude, in series opposition to a control voltage derived from the energizing circuit of the specimen and proportional to the current flowing through the specimen. The resulting difference of the reference voltage and control voltage is then applied for controlling a current-control member in the specimen circuit, preferably through a regulating amplifier, in the sense required to reduce the difference voltage to the zero value. In this manner the current density in the semiconductor rod is regulated to a predetermined constant value depending upon the diameter and hence upon the cross section of the semiconductor as preset at the potentiometer. As a result, a measuring instrument, which has a pair of probe terminals of mutually fixed spacing placed against any two longitudinally spaced points along the measuring length of the specimen rod, will indicate a voltage drop directly proportional to the specific resistance of the semiconductor material at the testing location. Preferably, therefore, the instrument has an indicating scale directly calibrated in terms of specific resistance (ohm·cm.), the indicated value being in each case equal to the mathematical product of a constant value times the voltage drop measured between the instrument terminals along the semiconductor rod.

The particular manner in which the diameter of the semiconductor rod is determined prior to commencing the measuring operation proper, is irrelevant to the invention. When determining the diameter manually, a suitable mechanical measuring gauge can be used, for example a caliper-instrument with a measuring scale, or similar conventional gauging devices. If an automatic measuring of the rod diameter is desired, it may be effected, for example, by means of electrically inductive transducers or optically with the aid of photocells, or in accordance with the pneumatic method requiring the rod to be surrounded by a hollow cylinder which has its inner peripheral surface, facing the surface of the semiconductor rod, provided with nozzle openings that are traversed by a flow of gas under pressure. In the latter case the impedance to which the flow of gas is subjected by the presence of the rod is then available as a measure for the diameter of the rod, in a manner similar to the one used, for example, for measuring the diameters of cylinder bores of internal combustion engines.

For further explaining the invention, reference will be made to the accompanying drawing showing by way of example the schematic circuit diagram of a device embodying the features of the invention.

Denoted by 1 is a semiconductor specimen in form of a rod consisting, for example, of monocrystalline silicon, the thickness of the rod being shown exaggerated relative to its length. A test current is being passed through the semiconductor rod from constant-voltage supply means represented by respective terminals 2 and 5. The current passes in series from terminal 2 through the specimen rod 1, thence through the anode-cathode gap of a triode tube 3 and a voltage drop resistor 4 to the negative terminal 5 of the voltage source. During operation there occurs along the resistor 4 a voltage drop which is proportional to the current flowing through the specimen and which is employed as a control magnitude in the device according to the invention.

The device is further equipped with a potentiometric voltage divider 6 composed of individual, series-connected resistors 7 to 12. During operation, these resistors are traversed by an auxiliary current supplied by a direct voltage supply source 19 connected to terminals 13 and 14. The direct voltage supply source 19 may comprise a battery. The potentiometer has a displaceable tap contact 16 provided with a pointer to cooperate with an indicator scale 15 calibrated in diameter values relating to the range of different diameters which the specimen rods to be tested may possess. While only five tap positions for the slide contact 16 are shown, any desired larger number may be used in accordance with the desired degree of accuracy and the desired range of different specimen diameters for which the device is to be applicable.

The potentiometer resistors 7 to 12 have respectively graduated resistance values so that, for each setting of the potentiometer, the output voltage between terminal 13 and tape contact 16 changes in accordance with a square-law characteristic when the tap contact 16 is placed from one to another position. This output voltage is employed as a preadjusted reference voltage and is connected in series-opposition to the voltage taken from the resistor 4. The difference voltage is impressed upon the input circuit of an amplifier 17 which serves for regulating the resistance constituted by the triode 3 in the circuit of the specimen. For this purpose the amplified output voltage of the regulating amplifier 17 is impressed between grid and cathode of the triode 3 in series-opposition to the voltage drop of resistor 4, so that the plate current of the triode is varied until the difference between that voltage drop and the adjusted reference voltage is reduced to zero.

Connected to the measuring length of the specimen 1 are the two probe electrodes of a measuring circuit that comprises a voltage-responsive instrument 18, the probes having a fixed spacing from each other which may amount to 1 cm., for example. The instrument 18 has its indicating scale directly calibrated in terms of specific resistance, namely in ohm·cm.

The measuring operation is performed as follows. First the diameter of the specimen rod 1 at the measuring distance is determined. According to this diameter, the tap contact 16 of potentiometer 6 is set to the proper position indicated on scale 15. When the voltage sources across terminals 2–5 and 13–14 are switched on, the voltage drop along the resistor 4 in the specimen circuit corresponds to the current passing through the specimen. This voltage drop, together with the tapped-off reference voltage furnished from the potentiometer 6 provide a difference voltage to the regulating amplifier 17 in the sense and with the magnitude required for controlling the plate current in the triode 3 until the control voltage from resistor 4 and the reference voltage from potentiometer 6 have virtually become equal to each other. In this condition, the specific resistance of the semiconductor specimen at the measuring location can be directly read off the instrument 18.

The device can be made more versatile by composing the voltage-drop resistor 4 of a set of resistors whose resistance members can be selectively employed individually or in combination in order to thus permit adjusting corresponding resistance ranges, thereby increasing the range of semiconductor materials and semiconductor dimensions for which the device is applicable.

Such and various other modifications will be obvious to those skilled in the art, upon a study of this disclosure, and are indicative of the fact that my invention can be given embodiments other than particularly illustrated and described herein, without departing from the essential features of the invention and within the scope of the claims annexed hereto.

I claim:

1. The method of measuring the specific electric resistance of a solid semiconductor specimen, which comprises passing a test current through a current control member and the semiconductor specimen;

supplying a reference voltage adjustable in accordance with the cross-sectional diameter of the semiconductor specimen, and presetting the reference voltage to the value correlated to the diameter of the particular specimen being tested;

combining a reference value representing the reference voltage with the test current;

varying the test current by controlling the current control member in dependence upon the departure of the test current from a reference value represented by said preset reference voltage and in the sense required to eliminate said departure; and tapping a measuring voltage from the specimen along a fixed distance in the current flow direction and applying it to a single voltage responsive instrument calibrated in terms of ohm-cm. of specific resistance.

2. The method of measuring the specific electric resistance of a solid semiconductor specimen, which comprises passing test current through a controllable resistive member and the specimen, and tapping a measuring voltage from the specimen along a given measuring distance in the current flow direction;

passing auxiliary current through resistance means incrementally adjustable in accordance with respectively different specimen diameters and having a resistance value incrementally changeable in accordance with a square function to provide a correspondingly adjustable reference voltage, and setting the resistance means to the adjustment that corresponds to the cross-sectional diameter of the particular specimen being tested;

providing from the test current a voltage drop proportional thereto and forming the difference voltage from said reference voltage and said voltage drop; and controlling said resistive circuit member in accordance with said difference voltage in the sense required to reduce said difference voltage substantially to a given minimum range whereby the then obtaining measuring voltage is indicative of the specific resistance of the semiconductor specimen at said measuring distance.

3. The method of measuring the specific electric resistance of a solid semiconductor specimen, which comprises passing a test current from a supply of normally constant direct voltage in series through a current-control member, a voltage-drop resistor and the specimen; tapping a measuring voltage from the specimen along a given distance in the current flow direction, and tapping from the resistor a voltage drop proportional to the current;

passing auxiliary current through resistance means incrementally adjustable in accordance with respectively different specimen diameters and having a resistance value incrementally changeable in accordance with a square function to provide a correspondingly adjustable reference voltage, and setting the resistance means to the adjustment that corresponds to the cross-sectional diameter of the particular specimen being tested;

adding said reference voltage and said voltage proportional to said current in series-opposed relation to produce a difference voltage; and and controlling said current-control member in accordance with said difference voltage in the sense required to reduce said difference voltage substantially to a given minimum range whereby the then obtaining measuring voltage is indicative of the specific resistance of the semiconductor specimen at said measuring distance.

4. A device for measuring the specific electric resistance of a solid semiconductor specimen, comprising a main testing circuit having voltage terminals for connecting the specimen therebetween and having a current-control member serially interposed between said terminals, said specimen having a test current flowing therethrough;

potentiometric voltage supply means having an output voltage adjustable in accordance with the cross-sectional diameter of the semiconductor specimen to serve as reference voltage;

voltage means connected with said testing circuit for supplying a control voltage proportional to said test current;

circuit means connected to said current-control member for causing it to vary said current, said reference voltage and said control voltage being in series-opposed connection with each other in said circuit means whereby said test current is controlled to assume a value at which said reference voltage and said control voltage substantially balance each other relative to said circuit means; and a measuring circuit tapped off the specimen along a given distance in the flow direction of the test current, said measuring circuit comprising a single voltage-responsive instrument indicative of the ohm-cm. of specific resistance to be measured.

5. A device for measuring the specific electric resistance of a solid semiconductor specimen, comprising a main testing circuit having voltage terminals for connecting the specimen therebetween and having a voltage-drop resistor and a current-control member serially interposed between said terminals;

a reference circuit having potentiometer resistance means incrementally adjustable in accordance with the cross-sectional diameter of the semiconductor specimen and having a resistance in accordance with a square-law progression so as to provide a corresponding incrementally adjustable reference voltage;

regulating means connected to said current-control member for controlling said member to vary the current in the specimen, said regulating means having an input circuit connected to said voltage drop resistor and to said reference circuit with said reference voltage and the voltage drop from said resistor in opposed relation to each other as regards their effects upon said regulating means, whereby said regulating means are controlled to regulate the test current to substantially balance between said reference voltage and said voltage drop for the specimen cross section to which said potentiometer resistance means are adjusted;

and a measuring circuit tapped off the specimen along a given distance in the flow direction of the test current, said measuring circuit comprising a single voltage-responsive instrument indicative of the ohm-cm. of specific resistance to be measured.

6. In a device for measuring the specific electric resistance of a semiconductor specimen according to claim 5, said main testing circuit and said reference circuit comprising respective direct-voltage supply means of normally constant voltage, and said instrument in said measuring circuit being a voltmeter having an indicative scale calibrated directly in values of ohm-cm. of specific resistance.

References Cited

UNITED STATES PATENTS

| | | | |
|---|---|---|---|
| 2,749,512 | 6/1956 | Blair | 324—6 X |
| 2,871,446 | 1/1959 | Wann | 324—62 X |
| 3,048,776 | 8/1962 | Logan | 324—62 X |

RUDOLPH V. ROLINEC, *Primary Examiner.*

WALTER L. CARLSON, *Examiner.*

C. A. S. HAMRICK, W. H. BUCKLER, E. E. KUBASIEWICZ, *Assistant Examiners.*